May 5, 1970     J. W. MULLINS     3,509,905

LINE CLAMPING SELF-TAPPING SERVICE VALVE

Filed Nov. 15, 1967

JOHN W. MULLINS
*INVENTOR.*

BY

*Robert K. Rhea*
AGENT

United States Patent Office 3,509,905
Patented May 5, 1970

3,509,905
LINE CLAMPING SELF-TAPPING SERVICE VALVE
John W. Mullins, P.O. Box 20524,
Oklahoma City, Okla. 73120
Continuation-in-part of application Ser. No. 650,322,
June 30, 1967. This application Nov. 15, 1967, Ser.
No. 683,382
Int. Cl. F16l 41/04
U.S. Cl. 137—318                          1 Claim

ABSTRACT OF THE DISCLOSURE

A U-shaped member straddles a line to be tapped. The legs of the U-shaped member project beyond the line and are transversely drilled for receiving a pin which journals a cube-shaped block between the legs. Each face of the block is provided with a line receiving recess for use with a like plurality of different sizes of lines. The bight portion of the U-shaped member is centrally drilled and threaded perpendicular to the axis of the straddled line for threadedly receiving a centrally bored air valve core equipped valve housing having a line piercing core coaxially projecting into the line.

Cross reference to related applications

The present invention is an improvement over my copending applications for Line Tap Valve filed May 26, 1967, Ser. No. 641,510 and Line Tap Valve and Housing filed June 30, 1967, Ser. No. 650,322, now abandoned.

The principal distinction between this application and the above copending applications resides in the manner of attaching the valve housing to a line to be tapped.

Background of the invention

The present invention relates to a line clamping and self-tapping service valve for refrigerant lines.

Many sealed refrigerating systems are not provided with service valves on the high or low pressure refrigerant conductor line. It is highly desirable to provide a means for ascertaining the amount of refrigerant gas or lack of it contained by the system or to determine on which side of the compressor the trouble lies without disassembling the system.

Most service valves of this class require that the refrigerant gas be removed from a conductor line and the service valve soldered into the line thus necessitating a recharging of the system.

The present invention includes a U-shaped member having a grooved block journaled between its legs which cooperatively receives and nests a portion of a line to be tapped. A valve equipped housing is threadedly inserted through the bight portion of the U-shaped member so that a line tapping core, carried by the valve housing, pierces and seals with the line being tapped. This eliminates the necessity of removing the refrigerant and forms a permanent part of the system.

Summary of the invention

A clamp means surrounds a line to be tapped. The clamp means comprises a U-shaped body having its legs loosely straddling the line. The legs of the U-shaped body are transversely drilled, in their end portion projecting beyond the line, for receiving a cube-shaped block having a groove in each of its faces for nesting a peripheral portion of a line. A pin extends through the bore in the legs of the U-shaped body and through a bore in the block. The spacing between the selected groove and the bight portion of the U-shaped body is such that the bight portion contacts the line opposite the block. The bight portion of the U-shaped body is bored and threaded perpendicular to the axis of the line. A centrally bored air valve core equipped housing is threadedly received by the threaded bore in the body. A centrally drilled line tapping core, coaxially connected with the inwardly directed end of the valve housing, pierces the line as the valve housing is screwed into the body thus completing the clamping action on the line and forming a seal between the line piercing core and the wall of the line. Since the block is provided on its respective faces with a like plurality of substantially semicircular grooves formed on respectively different radii, this line tapping valve may be used on a selected one of a plurality of different sizes of refrigerant lines by merely positioning the block so that one of its grooves cooperatively contacts a peripheral portion of the line to be tapped thus eliminating the requirement of a service valve for each size line.

The principal object of this invention is to provide a line gripping and self-tapping service valve for connection with a plurality of different sizes of lines which forms a seal with the wall of the tapped line without the use of gaskets, packing, or the like.

Description of the preferred embodiments

Figure 1:
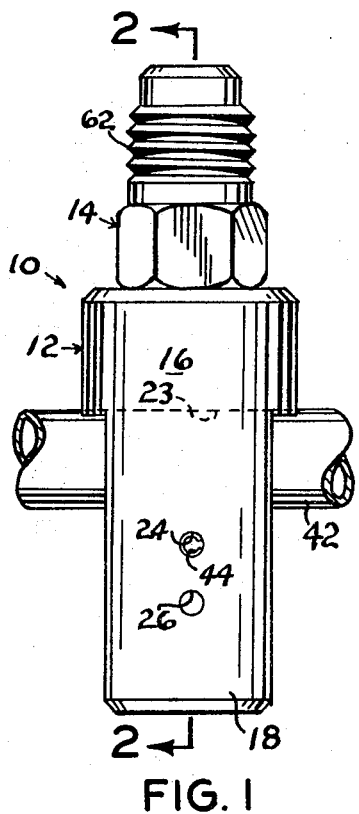
FIG. 1 is a side elevational view of the device installed on a fragment of a line.

Like characters of reference designate like parts in those figures of the drawings in which they occur.

In the drawings:

The reference numeral 10 indicates the device, as a whole, comprising a line clamping means 12 and a valve housing 14. The clamping means 12 comprises a cylindrical-like body 16 bifurcated from one end to form a U-shape having legs 18 and 20 and defining a bight surface 22. Diametrically the body 16 is substantially greater than the largest outside diameter of a line to be tapped. The inner surfaces of the legs 18 and 20 are flat and parallel and the spacing therebetween must be greater than the outside diameter of the largest line to be tapped. Similarly the distance between the bight surface 22 and the free ends of the legs 18 and 20 is substantially greater than the diameter of the largest line to be tapped. The bight surface 22 is preferably provided with a shallow recess 23 (FIG. 1) parallel with the inner flat faces of the legs for nesting a portion of a line being tapped. The legs 18 and 20 are transversely line drilled, as at 24 and 26, for the purposes presently explained.

A substantially cube-shaped line gripping block 30 is provided on its respective faces with a like plurality of different sizes of substantially semicircular recesses or grooves 31, 32, 33, 34, 35 and 36, each formed on a radius complemental with respect to a like plurality of lines to be tapped. The dimensions of the block 30 are such that any two opposing surfaces may be slidably received between the opposing inner flat surfaces of the legs 18 and 20. The block 30 is transversely drilled, as at 38 and 40, so that the block 30 may be positioned between the legs 18 and 20 with a selected one of the grooves 31 and 36 facing toward the bight surface 22. When thus positioned with one of the grooves, for example, the groove 33, facing toward the bight surface 22 and contacting a line 61 to be tapped, a pin 44 is extended through the leg bores 24 and the block bore 38 to hold the clamp means 12 on the line 42. As shown more clearly in FIG. 1, the pin 44 is of the split tubular type.

The bight portion of the body 16 is coaxially drilled and threaded, as at 48. The valve housing 14 is centrally drilled, as at 49, and is provided with one externally threaded end portion 50 cooperatively received by the threads 48. The valve end portion 50 is centrally counterbored, as at 52, for receiving a line tapping core 54 having one cylindrical end portion which is pressed into the counterbore 52. The line tapping core has a diametrically reduced end portion 56 projecting outwardly of the valve housing bore 52 which terminates in a cone-shaped pointed end portion 58 for piercing a line 61 to be tapped. The cone-shaped end portion is transversely drilled, as at 59. The core 54 is centrally drilled, as at 60, to intersect the transverse bore 59. Boring the core 54 in this manner provides an imperforate line piercing tip end portion and minimizes the likelihood of the bore of the core 54 being closed by a fragment of the pierced line.

The outwardly disposed end portion of the valve housing 14 is externaly threaded, as at 62, for receiving a dust cap, not shown. The bore of the outwardly projecting end portion of the valve housing 14 is internally enlarged and threaded, as at 64, and provided with a seat 65 for receiving a conventional air valve core 66 for the admission and release of gas through the valve housing after the device is assemhbled on a line 61.

Figure 3:
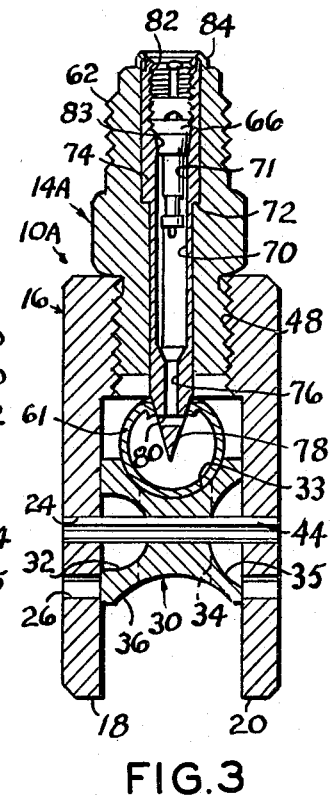
FIG. 3 is a view similar to FIG. 2 illustrating an alternative line piercing core; and, FIG. 4 is a perspective view of a grooved block forming a part of the line clamping means.
Figure 4:
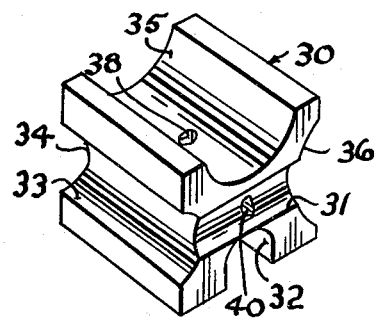

An alternative embodiment is illustrated in FIG. 3 in which identical parts bear identical reference numerals. In this embodiment the valve housing 14A is provided with an axial bore 72 which is counterbored, as at 71, from its outwardly projecting end to form an annular shoulder 72 intermediate its ends. A line tapping core 74 is coaxially received by the bores 70 and 71 and includes an annular shoulder which seats against the valve housing shoulder 72. The core 74 is centrally drilled, as at 76, and provided, at its inwardly directed end, with a cone-shaped sharpened end portion 78 for piercing the line 61. The cone-shaped end portion 78 is similarly transversely drilled, as at 80, to intersect the bore 76. The bore 76 of the core is enlarged in its outwardly directed end portion and internally threaded, as at 82, and provided with a seat 83 for receiving the conventional air valve core 66. The outwardly directed end portion of the valve housing 14A is provided with a relatively thin walled flange 84 which is turned or crimped inwardly against or over the outwardly directed end portion of the core 74 thus locking the core within the valve housing.

Operation

In operation the service valve 10 is connected to the refrigerant line 61 by assembling the device on the line. This is accomplished by positioning the legs 18 and 20 of the U-shaped body 16 on opposing sides of the line 61 at a selected location with the bight portion 22 contacting a peripheral portion of the line 61. The cube 30 is positioned between the legs 18 and 20 with the selected one of the line nesting recesses numbered 31 through 36 in contact with a peripheral portion of the line opposite the bight sufrace 22. The pin 44 is then inserted through the leg aperture 24 or 26 according to the size of the line being tapped and through the respective one of the aligned cube holes 38 or 40. The valve housing 14, with the air valve core 66 in place, is engaged with the threads 48 and progressively screwed into the body 16 as by the use of a wrench, not shown, until the cone-shaped end portion 58 pierces the line 61 and the wrench head of the valve housing engages the adjacent end surface of the body 16.

Figure 2:
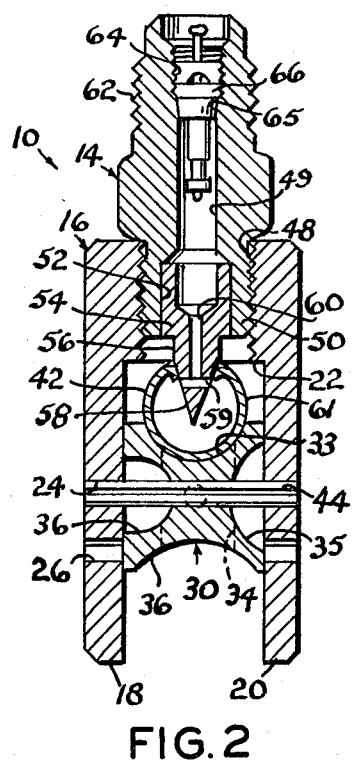
FIG. 2 is a vertical cross-sectional view taken substantially along the line 2—2 of FIG. 1.

As clearly shown in FIG. 2, the transverse bore 59 is thus free of any ruptured portion of the line wall so that free communication between the line 61 and the bore 49 of the valve housing permits free flow of gases.

Operation of the alternative embodiment 10A is substantially identical to that described for the device 10 in that the valve housing 14A, with the core 74 seated therein may be screwed into the body 16 to pierce the line 61. Alternatively valve housing 14A may be screwed into the body 16 before inserting the core 74. The core 74 may then be positioned within the bore of the valve housing and forced into the line 61 to the position shown in FIG. 3 by threadedly engaging a dust cap, not shown, with the valve housing threads 62.

Obviously the invention is susceptible to some change or alteration without defeating its practicability, and I therefore do not wish to be confined to the preferred embodiment shown in the drawings and described herein.

I claim:
1. A line tapping service valve, comprising:
line clamping means including a substantially U-shaped member having a bight portion and a pair of legs straddling and projecting beyond the line to be tapped, said legs being transversely bored in aligned relation, said bight portion having a threaded bore perpendicular to the axis of the line to be tapped;
a pin extending through the transverse bores in said legs;
a cube-shaped block fitted between said legs and journaled for rotation about the axis of said pin, said block having a coextensive recess in opposing surfaces,
each said recess being formed on a radius complemental with the radius of the outside diameter of a line to be tapped for nesting a peripheral portion of the line and positioning an opposite peripheral portion of the line in contact with the bight portion of said U-shaped member;
a centrally bored and coaxially threaded housing engaging the threaded bore of said bight portion;
a line piercing core coaxially secured within the bore of said housing and projecting, at one end portion, beyond said housing and terminating in a sharpened tip end, whereby when said housing is progressively engaged, threadedly, with the threaded bore of said bight portion said sharpened tip end is forced through and seals with the wall of a line to be tapped, said core having a gas passageway communicating with the bore of the tapped line; and
a valve within said core for opening and closing the gas passageway.

References Cited
UNITED STATES PATENTS

| | | | |
|---|---|---|---|
| 2,109,259 | 2/1938 | Yirava | 62—294 |
| 2,875,777 | 3/1959 | Lacart | 137—318 |
| 3,162,211 | 12/1964 | Barusch | 137—318 |
| 3,252,475 | 5/1966 | Jones | 137—318 |
| 3,272,211 | 9/1966 | Leopold et al. | 137—318 |

WILLIAM F. O'DEA, Primary Examiner

D. R. MATTHEWS, Assistant Examiner

U.S. Cl. X.R.
285—197